C. P. POND.
FLOATING TIRE RACK.
APPLICATION FILED MAR. 27, 1917.
1,304,902.
Patented May 27, 1919.
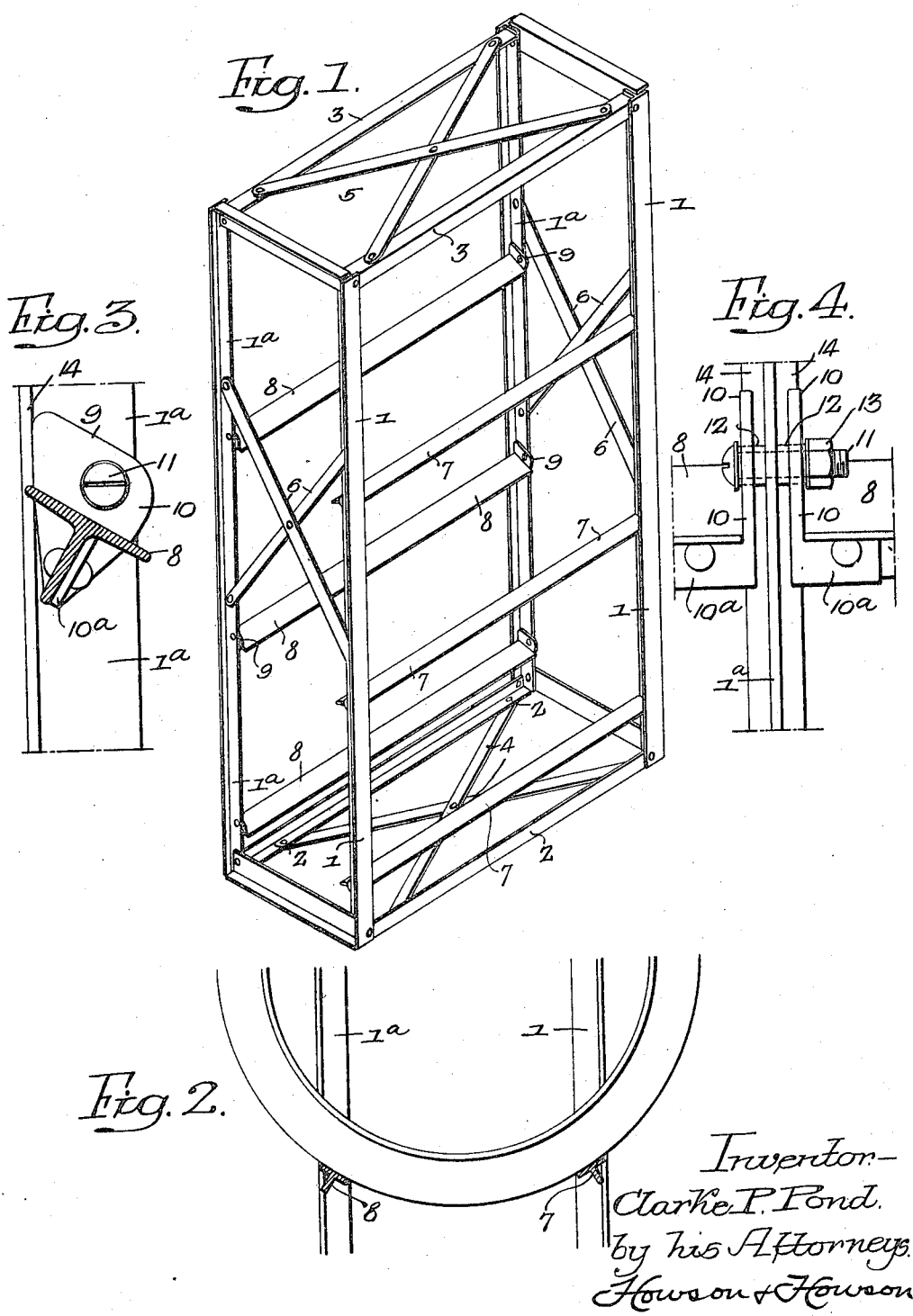
Inventor—
Clarke P. Pond.
by his Attorneys.
Howson & Howson

UNITED STATES PATENT OFFICE.

CLARKE P. POND, OF PHILADELPHIA, PENNSYLVANIA.

FLOATING TIRE-RACK.

1,304,902.   Specification of Letters Patent.   Patented May 27, 1919.

Application filed March 27, 1917. Serial No. 157,755.

*To all whom it may concern:*

Be it known that I, CLARKE P. POND, a citizen of the United States, residing in Philadelphia, Pennsylvania, have invented Floating Tire-Racks, of which the following is a specification.

One object of my invention is to provide a relatively simple and inexpensive structure for supporting motor vehicle tires whose parts shall be so disposed to support a tire in such manner that it will not sag out of shape.

It is further desired to provide a rack or support which will provide or at all times present flat members for engagement with a tire which members shall be so mounted as to float or automatically take up positions tangent to the curved periphery of a tire regardless of its diameter, with a view to preventing deformation of the rubber or damage to the paper wrapping;—the invention particularly contemplating an arrangement of parts which may be easily erected and taken down and which shall occupy a minimum of floor space.

These objects and other advantageous ends I secure as hereinafter set forth, reference being had to the accompanying drawings, in which:

Figure 1 is a perspective view of a simple form of rack constructed according to my invention;

Fig. 2 is a vertical section of a part of my rack showing the preferred arrangement of parts;

Fig. 3 is an enlarged fragmentary vertical section illustrating the connection between one of the tire engaging members and the main frame; and Fig. 4 is a front elevation of a structure similar to that shown in Fig. 3, but illustrating an arrangement for connecting the adjacent ends of two tire supporting members to the frame.

From Fig. 1 of the above drawings it will be seen that my tire rack consists of a vertically elongated frame of rectangular section made up of four verticals 1—1 and $1^a$—$1^a$, extending between the base frame 2 and a top frame 3. The first of these is braced by diagonal members 4 and the latter is similarly braced by diagonal members 5 while each pair of verticals 1—$1^a$ is tied together and braced by diagonals 6—6. This frame is relatively rigid and the members are preferably made of light rolled sections such as T or angle bars.

For supporting or carrying tires I connect the verticals 1—1 by suitably spaced T-bars 7 and likewise connect the rear verticals $1^a$—$1^a$ by a series of suitable T-bars 8 respectively at the same levels as the T-bars 7. These T-bars are so mounted as to be rotatable on longitudinally extending axes or are free to float relatively to a tire as hereafter noted, for which purpose they may be pivotally or rotatably connected to the verticals by any suitable means, preferably through the medium of castings 9 each consisting of a flat plate or body portion 10 having a lug $10^a$ projecting at right angles and rigidly or otherwise suitably connected to the tire engaging member 7 or 8 as the case may be.

The body 10 of the casting is pivotally connected to the vertical member 1 or $1^a$ by a bolt 11 which passes through it and through the wide portions of said vertical, there being a bearing 12 of brass or bronze preferably interposed between the bolt and the body 10. If the tire-engaging member 7 or 8 is made in more than one length, as indicated in Fig. 4, the adjacent ends of any two alined lengths may be connected to the vertical 1 by a single bolt as shown, for which purpose the latter would be provided with one bushing between the web of the vertical and its head and a second bushing between said web and its nut 13, the two bushings being respectively engaged by the body portions 10 of the castings 9, which as above described, are rigidly fixed to the ends of the tire engaging members. These body or plate portions 10 of the castings each have one edge so shaped that the portion above the head of the tire-engaging T-bar 7 or 8 is normally held in engagement with the head 14 of the frame vertical 1 or $1^a$, in order to prevent the tire engaging member from turning on its pivot bolt 11 too far toward the position in which its head would be horizontal.

Likewise the same edge of the body portion 10 of the casting 9 is cut away downwardly from a point adjacent the head of the tire engaging member 7 toward the lower edge of the web thereof in such manner that after said member has turned on its pivot bolt through a predetermined angle, its further movement is prevented by reason of engagement of said edge with the head 14 of the frame vertical 1 or 1ª. Obviously the two tire supporting members 7 and 8 of each level are so mounted that when a tire is placed upon them as indicated in Fig. 2, it will engage the flat surface of their respective head or flange members, and in view of the fact that said members are free to turn or float on their pivot bolts 11 within the limits necessary to suit them to receive all sizes of tires, they will automatically assume positions in which said flat faces are tangent to the curve of the tire.

If at any time tires of larger diameter should be placed upon these members 7 and 8, they would at once turn on their pivots to again place the flat surfaces of their tops tangent to the curve of the tire. Similarly when smaller tires are mounted upon the members 7 and 8, the tire supporting members may swing on their pivot bolts toward each other so that in all cases the tire surface rests upon and is carried by a flat face lying tangent to the curve of the tire. By the movement limiting body portion 10 on their castings 9, the tire supporting bars 7 and 8 are carried or permitted to float in positions ready to receive tires, since they are prevented from turning in either direction beyond the positions approximating those required to carry the tire as described.

Obviously a tire supported on T-bars such as those illustrated, is not distorted, since there are no sharp edges to cut into it and for the same reason the paper wrappings customarily provided on the tires is in no way injured by the flat surfaces engaged. While the spacing of the front from the back members may be varied to a limited extent, the frame is preferably constructed so that about one quarter of the weight of a tire is carried on each side of a vertical plane passing through the axis of revolution of each of the tire supporting members and as a consequence the tire has no tendency to sag out of shape when supported as shown in Fig. 2.

I claim:—

1. The combination of a supporting structure; two horizontal flat members spaced apart thereon and both free to turn on their longitudinal axes; with means for positively preventing said members from moving their flat surfaces out of positions to engage the curved surface of a tire.

2. The combination in a tire rack of a frame; two parallel elongated members each having a flat surface and rotatably carried by said frame; and means for normally maintaining said members with their flat surfaces inclined toward each other while leaving them free to automatically adjust themselves to positions substantially tangent to the curved periphery of a tire.

3. The combination in a tire rack of a supporting frame; two parallel horizontally elongated T-irons mounted thereon, with their heads uppermost; lugs projecting substantially at right angles to said T-irons at the ends thereof in a direction away from their webs; and pivots connecting said lugs with the frame.

4. The combination in a tire rack of a supporting frame; two parallel horizontally elongated T-irons mounted thereon and free to rotate on their longitudinal axes; and means for normally maintaining said T-irons in positions with the flat surfaces of their flanges uppermost and inclined toward each other.

5. The combination of a supporting structure; two parallel horizontally elongated tire supporting members each having a tire receiving surface; supporting plates extending at right angles to said members at the ends thereof; and means for pivotally connecting said plates to the supporting structure in positions to permit said members turning on longitudinal axes between predetermined limits, said plates coacting with the supporting structure to normally maintain the tire supporting members with their receiving faces inclined toward each other.

6. The combination of a supporting frame; a pair of elongated T-irons; lugs connected to opposite ends of said T-irons and projecting at right angles to the same beyond the flanges thereof; with means for pivotally connecting said lugs to the frame to rotatably support the members parallel to each other, the lugs coacting with a part of the frame to limit the pivotal movement of the T-irons.

In witness whereof I affix my signature.

CLARKE P. POND.

Copies of this patent may be obtained for five cents each, by addressing the "Commissioner of Patents, Washington, D. C."